US008739072B1

(12) United States Patent
Krishnamurthy et al.

(10) Patent No.: US 8,739,072 B1
(45) Date of Patent: May 27, 2014

(54) MULTI-SELECTION WIDGET FOR SELECTING MULTIPLE TIME PERIODS AT MULTIPLE LEVELS WITHIN A TIME DIMENSION HIERARCHY

(71) Applicant: Visual BI Solutions Inc., Herndon, VA (US)

(72) Inventors: Gopal S. Krishnamurthy, Herndon, VA (US); Jayaraman Anantharaman, Tamilnadu (IN)

(73) Assignee: Visual BI Solutions Inc., Herndon, VA (US)

( * ) Notice: Subject to any disclaimer, the term of this patent is extended or adjusted under 35 U.S.C. 154(b) by 0 days.

(21) Appl. No.: 13/788,511

(22) Filed: Mar. 7, 2013

(51) Int. Cl.
*G06F 3/048* (2013.01)
*G06F 17/30* (2006.01)

(52) U.S. Cl.
USPC ........... 715/845; 707/754; 707/771; 715/771; 715/810; 715/835; 715/840; 715/846; 715/853

(58) Field of Classification Search
USPC .......... 707/754, 779; 715/771, 810, 835, 840, 715/845, 846, 853
See application file for complete search history.

(56) References Cited

U.S. PATENT DOCUMENTS

| | | | | |
|---|---|---|---|---|
| 5,909,678 | A * | 6/1999 | Bergman et al. | 1/1 |
| 5,946,666 | A * | 8/1999 | Nevo et al. | 705/36 R |
| 6,014,661 | A * | 1/2000 | Ahlberg et al. | 1/1 |
| 6,581,068 | B1 * | 6/2003 | Bensoussan et al. | 1/1 |
| 6,651,055 | B1 * | 11/2003 | Kilmer et al. | 1/1 |
| 7,293,031 | B1 * | 11/2007 | Dusker et al. | 1/1 |
| 7,296,232 | B1 * | 11/2007 | Burdick et al. | 715/738 |
| 7,461,077 | B1 * | 12/2008 | Greenwood | 1/1 |
| 7,856,604 | B2 * | 12/2010 | Hooper et al. | 715/841 |
| 2002/0165757 | A1 * | 11/2002 | Lisser | 705/10 |
| 2004/0128225 | A1 * | 7/2004 | Thompson et al. | 705/37 |
| 2005/0060300 | A1 * | 3/2005 | Stolte et al. | 707/3 |
| 2006/0156259 | A1 * | 7/2006 | Wagner et al. | 715/963 |
| 2006/0253475 | A1 * | 11/2006 | Stewart et al. | 707/100 |
| 2006/0262145 | A1 * | 11/2006 | Zhang et al. | 345/661 |
| 2007/0112750 | A1 * | 5/2007 | Seyffert | 707/4 |
| 2007/0130113 | A1 * | 6/2007 | Ting | 707/2 |
| 2007/0156569 | A1 * | 7/2007 | Vignet | 705/37 |
| 2007/0203902 | A1 * | 8/2007 | Bauerle et al. | 707/5 |

(Continued)

OTHER PUBLICATIONS

Appendix A, as filed in U.S. Appl. No. 12/319,145 (U.S. Patent Application Publication No. 2009/0178009 A1—Dotson).*

(Continued)

*Primary Examiner* — Tadeese Hailu
*Assistant Examiner* — Eric J Bycer
(74) *Attorney, Agent, or Firm* — Fish & Richardson P.C.

(57) ABSTRACT

Methods, systems, and apparatus, including computer programs encoded on a computer storage medium, for providing analytical information. The methods, systems, and apparatus include actions of providing code for a multi-selection widget. The widget includes multiple user-selectable controls aligned on a grid. The multiple user-selectable controls include a first set of one or more controls that are each associated with a different instance of a first level reporting period. The multiple user-selectable controls further include a second set of two or more controls that are each associated with a different instance of a second level reporting period that are shorter than the instances of the first level reporting period. The actions further include receiving a user selection of at least one control of the first set and at least one control of the second set and providing analytical information based on the user selection.

20 Claims, 11 Drawing Sheets

(56) References Cited

U.S. PATENT DOCUMENTS

| | | | |
|---|---|---|---|
| 2007/0255681 A1* | 11/2007 | Tien et al. | 707/2 |
| 2008/0034305 A1* | 2/2008 | Hawley et al. | 715/764 |
| 2008/0049039 A1* | 2/2008 | Berrill | 345/581 |
| 2008/0195608 A1* | 8/2008 | Clover | 707/5 |
| 2009/0178009 A1* | 7/2009 | Dotson et al. | 715/841 |
| 2009/0210430 A1* | 8/2009 | Averbuch et al. | 707/10 |
| 2009/0300544 A1* | 12/2009 | Psenka et al. | 715/810 |
| 2009/0313268 A1* | 12/2009 | Folting et al. | 707/100 |
| 2010/0287146 A1* | 11/2010 | Skelton et al. | 707/705 |
| 2010/0318545 A1* | 12/2010 | Handy et al. | 707/759 |
| 2012/0089633 A1* | 4/2012 | Vigneau | 707/769 |
| 2012/0131036 A1* | 5/2012 | Averbuch | 707/769 |
| 2013/0007645 A1* | 1/2013 | Kurniawan et al. | 715/769 |
| 2013/0007646 A1* | 1/2013 | Tranter | 715/769 |

OTHER PUBLICATIONS

Appendix B, as filed in U.S. Appl. No. 12/319,145 (U.S. Patent Application Publication No. 2009/0178009 A1—Dotson).*

"Period Selector Custom Component Suite for SAP BusinessObjects Dashboards/Xcelsius," Visualbis, reprinted from "http://www.visualbis.com/blogs/xcelsius/2012/06/27/period-selector-custom-component-suite-for-sap-businessobjects-dashboards-xcelsius/" on Aug. 23, 2013.

* cited by examiner

FIG. 5

| YEAR 1 | | YEAR 2 | | YEAR 3 | | YEAR 4 | |
|---|---|---|---|---|---|---|---|
| QUARTER 1 | | QUARTER 2 | | QUARTER 3 | | QUARTER 4 | |
| JAN | 532A | APR | 532D | JUL | 532G | OCT | 532J |
| FEB | 532B | MAY | 532E | AUG | 532H | NOV | 532K |
| MAR | 532C | JUN | 532F | SEP | 532I | DEC | 532L |

| YEAR 1 | YEAR 2 | YEAR 3 | YEAR 4 |
|---|---|---|---|
| YEAR 5 | YEAR 6 | YEAR 7 | YEAR 8 |
| QUARTER 1 | QUARTER 2 | QUARTER 3 | QUARTER 4 |
| JAN | APR | JUL | OCT |
| FEB | MAY | AUG | NOV |
| MAR | JUN | SEP | DEC |

600, 510, 520, 530

700

| | | | |
|---|---|---|---|
| YEAR 1 | YEAR 2 | YEAR 3 | YEAR 4 |
| QUARTER 1 | QUARTER 2 | QUARTER 3 | QUARTER 4 |

510 { YEAR row
520 { QUARTER row

| | | | |
|---|---|---|---|
| YEAR 1 | YEAR 2 | YEAR 3 | YEAR 4 |
| YEAR 5 | YEAR 6 | YEAR 7 | YEAR 8 |
| QUARTER 1 | QUARTER 2 | QUARTER 3 | QUARTER 4 |

510 { YEAR rows
520 { QUARTER row

| | | | |
|---|---|---|---|
| YEAR 1 | | | |
| QUARTER 1 | QUARTER 2 | QUARTER 3 | QUARTER 4 |
| JAN | APR | JUL | OCT |
| FEB | MAY | AUG | NOV |
| MAR | JUN | SEP | DEC |

510 { YEAR
520 { QUARTER
530 { months

| | | | |
|---|---|---|---|
| YEAR 1 | | | |
| QUARTER 1 | QUARTER 2 | QUARTER 3 | QUARTER 4 |

510 { YEAR
520 { QUARTER

| | 1110A | 110B | 110C | 110D |
|---|---|---|---|---|
| 510 | YEAR 1 | | | |
| 520 | QUARTER 1 ↓ | QUARTER 2 ↑ | QUARTER 3 ↓ | QUARTER 4 ↑ |
| 530 | JAN | APR | JUL | OCT |
| | FEB | MAY | AUG | NOV |
| | MAR | JUN | SEP | DEC |

FIG. 12

| | | | | | | | | |
|---|---|---|---|---|---|---|---|---|
| 510 | YEAR 1 | | | | | | | |
| 520 | QUARTER 1 | | QUARTER 2 | | QUARTER 3 | | QUARTER 4 | |
| 530 | JAN | ↑ | APR | ↑ | JUL | ↓ | OCT | ↑ |
| | FEB | ↓ | MAY | ↑ | AUG | ↑ | NOV | ↓ |
| | MAR | ↓ | JUN | ↑ | SEP | ↓ | DEC | ↑ |

FIG. 13

| | | | | | | | | |
|---|---|---|---|---|---|---|---|---|
| 510 | YEAR 1 | | | | | | | |
| 520 | QUARTER 1 ↓ | | QUARTER 2 ↑ | | QUARTER 3 ↓ | | QUARTER 4 ↑ | |
| 530 | JAN | ↑ | APR | ↑ | JUL | ↓ | OCT | ↑ |
| | FEB | ↓ | MAY | ↑ | AUG | ↑ | NOV | ↓ |
| | MAR | ↓ | JUN | ↑ | SEP | ↓ | DEC | ↑ |

FIG. 14

| | | | | |
|---|---|---|---|---|
| 510 | YEAR | | | |
| 520 | QUARTER 1 ↓ | QUARTER 2 ↑ | QUARTER 3 ↓ | QUARTER 4 ↑ |

MULTI-SELECTION WIDGET FOR SELECTING MULTIPLE TIME PERIODS AT MULTIPLE LEVELS WITHIN A TIME DIMENSION HIERARCHY

TECHNICAL FIELD

This disclosure generally relates to a data analytics and, according to one particular implementation, to a user interface widget.

BACKGROUND

Widgets are used in graphical user interfaces to allow users of the interface to interact with a system.

SUMMARY

In general, an aspect of the subject matter described in this specification may involve a multi-selection widget. The multi-selection widget may include controls associated with a first level reporting period, e.g., years, and controls associated with a second level reporting period, e.g., months. The multi-selection widget may enable a user to select one or more years and one or more months that are non-continuous using the controls, e.g., the years 2010 and 2012, and the months January, May, June, and December. The process may further include receiving the user's selection and providing analytical information based on the user's selection, e.g., data for January 2010, May 2010, June 2010, December 2010, January 2012, May 2012, June 2012, and December 2012.

In some aspects, the subject matter described in this specification may be embodied in methods that include the actions of providing code for a multi-selection widget. The widget may include multiple user-selectable controls aligned on a grid. The multiple user-selectable controls may include a first set of one or more controls that are each associated with a different instance of a first level reporting period. The first set of one or more controls may be included in a first section of the grid. The multiple user-selectable controls may further include a second set of two or more controls that are each associated with a different instance of a second level reporting period that are shorter than the instances of the first level reporting period. The second set of two or more controls may be included in a second section of the grid. The actions may further include receiving a user selection of at least one control of the first set and at least one control of the second set and providing analytical information based on the user selection.

In some aspects, the subject matter described in this specification may be embodied in methods that include the actions of providing code for a multi-selection widget. The widget may include multiple user-selectable controls aligned on a grid. The multiple user-selectable controls may include a first set of two or more controls that are each associated with a different instance of a first level reporting period. The first set of two or more controls may be included in a first section of the grid. The actions may further include receiving a user selection of at least two controls of the first set and providing analytical information based on the user selection.

In some aspects, the subject matter described in this specification may be embodied in methods that include the actions of providing code for a multi-selection widget. The widget may include multiple user-selectable controls. The multiple user-selectable controls may include a first set of one or more controls, aligned on a first grid, that are each associated with a different instance of a first level reporting period. The multiple user-selectable controls may further include a second set of two or more controls, aligned on a second grid, that are each associated with a different instance of a second level reporting period that are shorter than the instances of the first level reporting period. The second set of two or more controls may be included in the second grid. The actions may further include receiving a user selection of at least one control of the first set and at least one control of the second set and providing analytical information based on the user selection.

In some aspects, the subject matter described in this specification may be embodied in methods that include the actions of providing code for a multi-selection widget. The widget may include multiple user-selectable controls aligned on a grid. The multiple user-selectable controls include a first set of one or more controls that are each associated with a different instance of a first level reporting period, the first set of one or more controls included in a first section of the grid. The actions may further include receiving a user selection of at least one control of the first set and capturing input based on the user selection.

Other versions include corresponding systems, apparatus, and computer programs, configured to perform the actions of the methods, encoded on computer storage devices.

These and other versions may each optionally include one or more of the following features. For instance, in some implementations the at least two controls of the second set of the user selection may be associated with instances of the second level reporting period that are non-consecutive relative to one another.

In certain aspects, the associated instances of the second set of the two or more controls may be non-overlapping and may collectively entirely cover an instance of the first level reporting period.

In some aspects, the multiple user-selectable controls may further include a third set of two or more controls that are each associated with a different instance of a third level reporting period that are shorter than the instances of the second level reporting period. The third set of two or more controls may be included in a third section of the grid. Receiving the user selection may include receiving at least one control of the third set. The first level reporting period may correspond to years, the second level reporting period may correspond to quarters, and the third level reporting period may correspond to months.

In some aspects, the first level reporting period may correspond to years and the second reporting period may correspond to months.

In certain aspects, the first level reporting period may correspond to quarters and the second level reporting period may correspond to months.

In certain aspects, the first set of one or more controls includes two or more controls and the user selection includes at least one control of the first set and at least two controls of the second set.

In some aspects, the actions may further include obtaining one or more alerts that are each associated with an instance of the different instances of a specific reporting period level. The widget may further include one or more alert indicators for one or more alerts. The one or more alerts may indicate a result of a comparison between a value of the associated instance of the specific level reporting period and another value, which may be either a corresponding value of an associated instance of the same level reporting period during a previous instance, or a different type of value that is also associated with the same instance of the same level reporting period. The result may include at least one of an increase or a decrease in the value. The reporting period at a specific level may correspond to a month, and the previous instance of the reporting period at the same level may correspond to the same month in the previous year.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 5 is an example widget including controls for first, second, and third level reporting periods.

FIG. 6 is an example widget including additional controls for a first level reporting period.

FIG. 7 is an example widget including controls for first and second level reporting periods.

FIG. 8 is an example widget including additional controls for a first level reporting period.

FIG. 9 is an example widget including a single control for a first level reporting period, and controls for a second and third level reporting period.

FIG. 10 is an example widget including a single control for a first level reporting period and controls for a second level reporting period.

FIG. 11 is an example widget including alert indicators in controls for a second level reporting period.

FIG. 12 is an example widget including alert indicators in controls for a third level reporting period.

FIG. 13 is an example widget including alert indicators in controls for second and third level reporting periods.

FIG. 14 is another example widget including alert indicators in controls for a second level reporting period.

Like reference symbols in the various drawings indicate like elements.

DETAILED DESCRIPTION

As described below, a multi-selection widget may allow users to dynamically select non-consecutive time periods to request analytical information associated with the non-consecutive time periods. The time periods may be, for example, years, quarters, or months. The analytical information may be, for example, business data including sales information, revenue information, cost information, or profit information.

Figure 1:
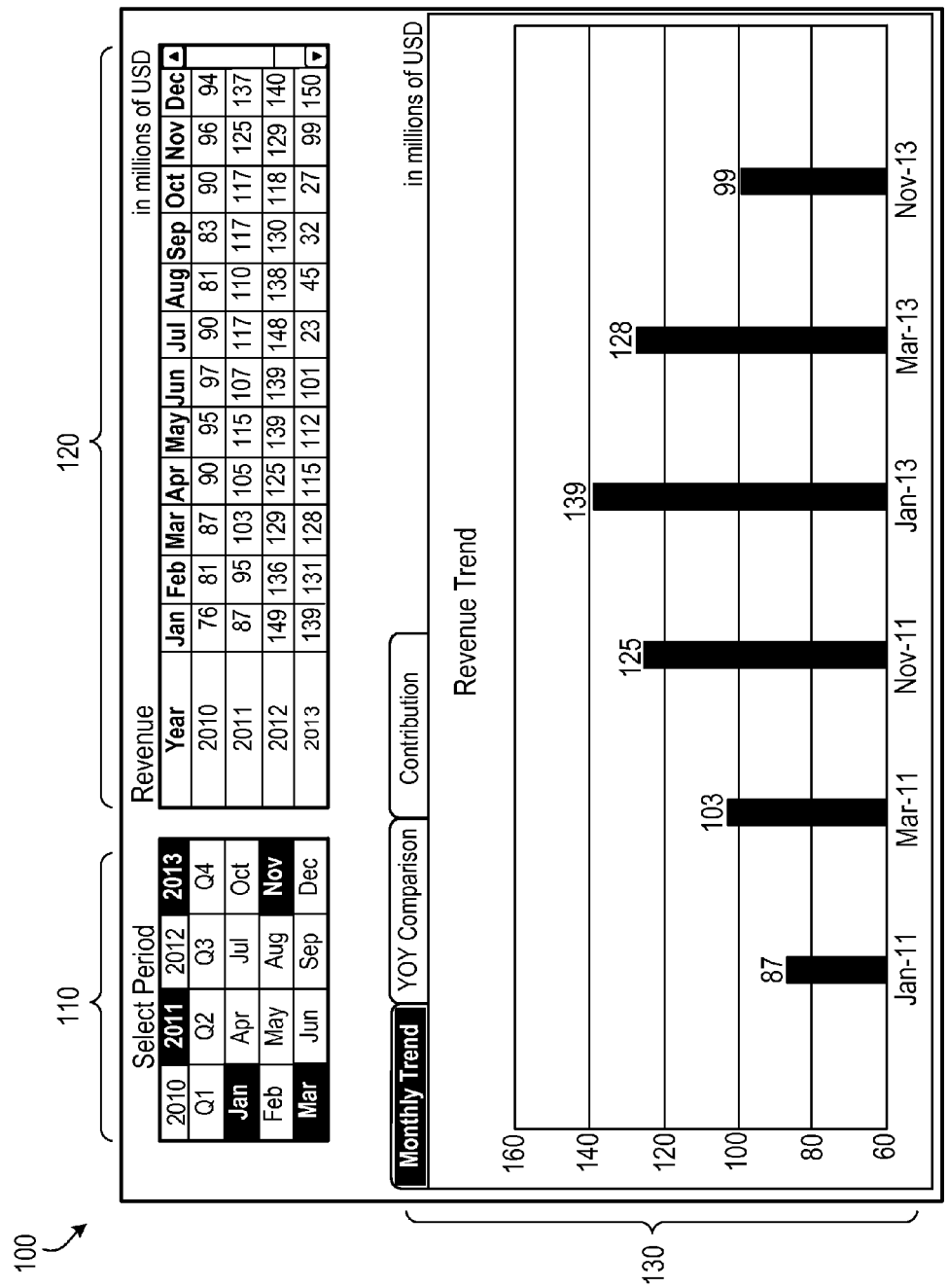
FIG. 1 is an example interface showing use of a widget.

FIG. 1 is an example interface 100 showing use of a widget 110. The interface 100 includes the widget 110, a data table 120, and an analytical information display 130. The widget 110 is a multi-selection widget that allows users to dynamically select non-consecutive time periods to request analytical information associated with the non-consecutive time periods. Portions of the widget 110 may be selected to select the non-consecutive time periods. The widget 110 is described in greater detail in regards to FIGS. 5-17.

Based on the selection in the widget 110, data shown in the data table 120 is analyzed to generate the analytical information display 130. In interface 100, selected portions of the widget 110 are shown shaded. As shown, the months January, March, and November are selected, and the years 2011 and 2013 are selected. Accordingly, the selection may indicate that the user wishes to view analytical information for January 2011, March 2011, November 2011, January 2013, March 2013, and November 2013.

The data table 120 shows the data for all time periods by time period. As shown, the data table 120 includes revenue data from the years 2010 to 2013 by month, where the rows differentiate the years, the columns differentiate the months, and the values in each cell indicate the revenue in millions of dollars for the corresponding month and year.

The analytical information display 130 displays analytical information based on the data for the selected time periods. For example, January 2011, March 2011, November 2011, January 2013, March 2013, and November 2013 are selected as shown by interface 100, and the analytical information display 130 is a bar graph showing a revenue trend where the bars are chronologically ordered and represent the revenue for each month of the selected months.

Figure 2:
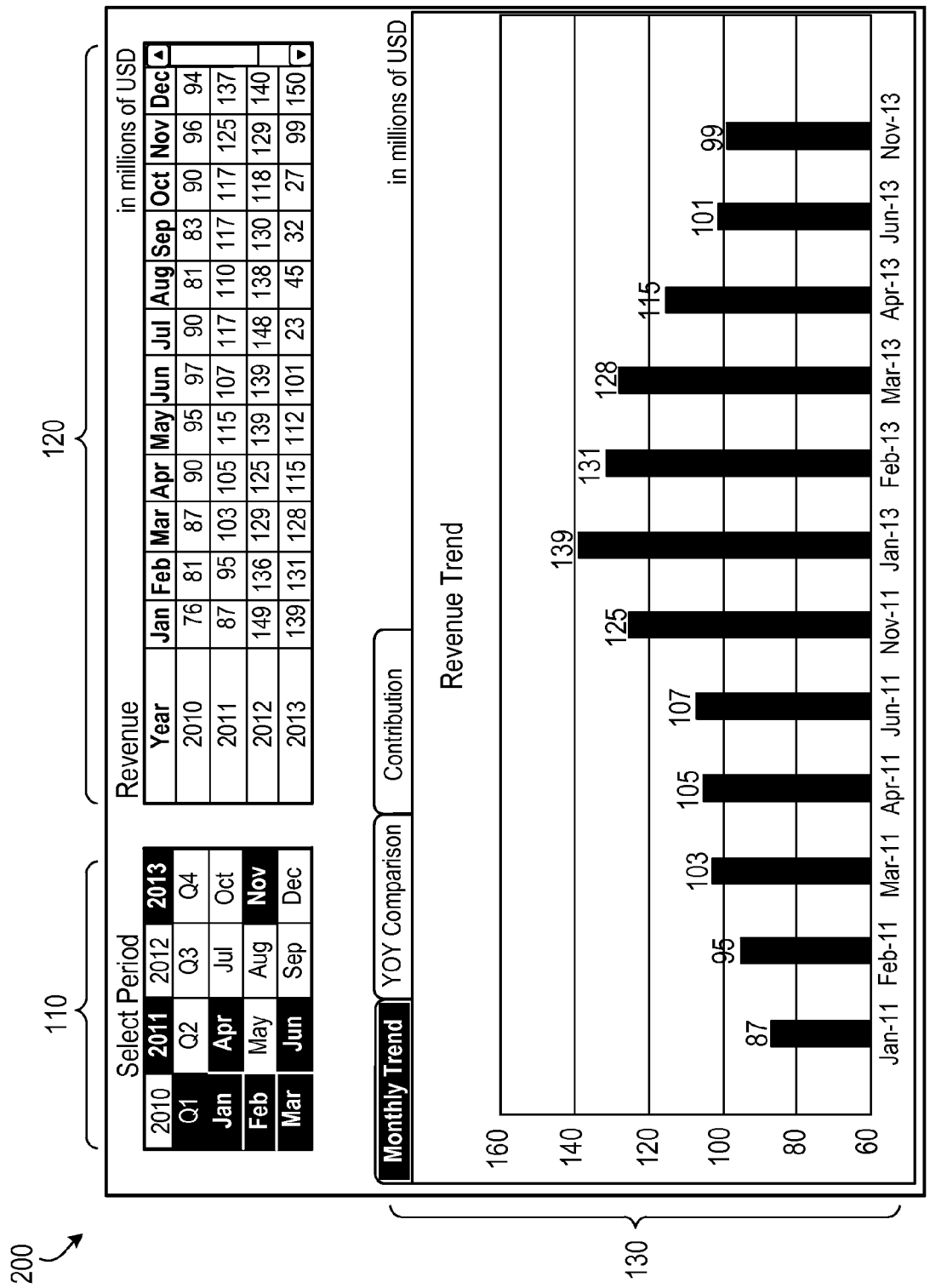
FIG. 2 is an example interface showing use of the widget of FIG. 1 with a different selection.

FIG. 2 is an example interface 200 showing use of the widget 110 of FIG. 1 with a different selection. As shown by interface 200, the widget 110 may also be used to select the quarter Q1, which may select the months of January, February, and March. The selection may further include the months of April, June, and November, and the years 2011 and 2013. Accordingly, the selection may indicate that the user wishes to view analytical information for January through April of 2011, June 2011, November 2011, January through April of 2013, June 2013, and November 2013.

Figure 3:
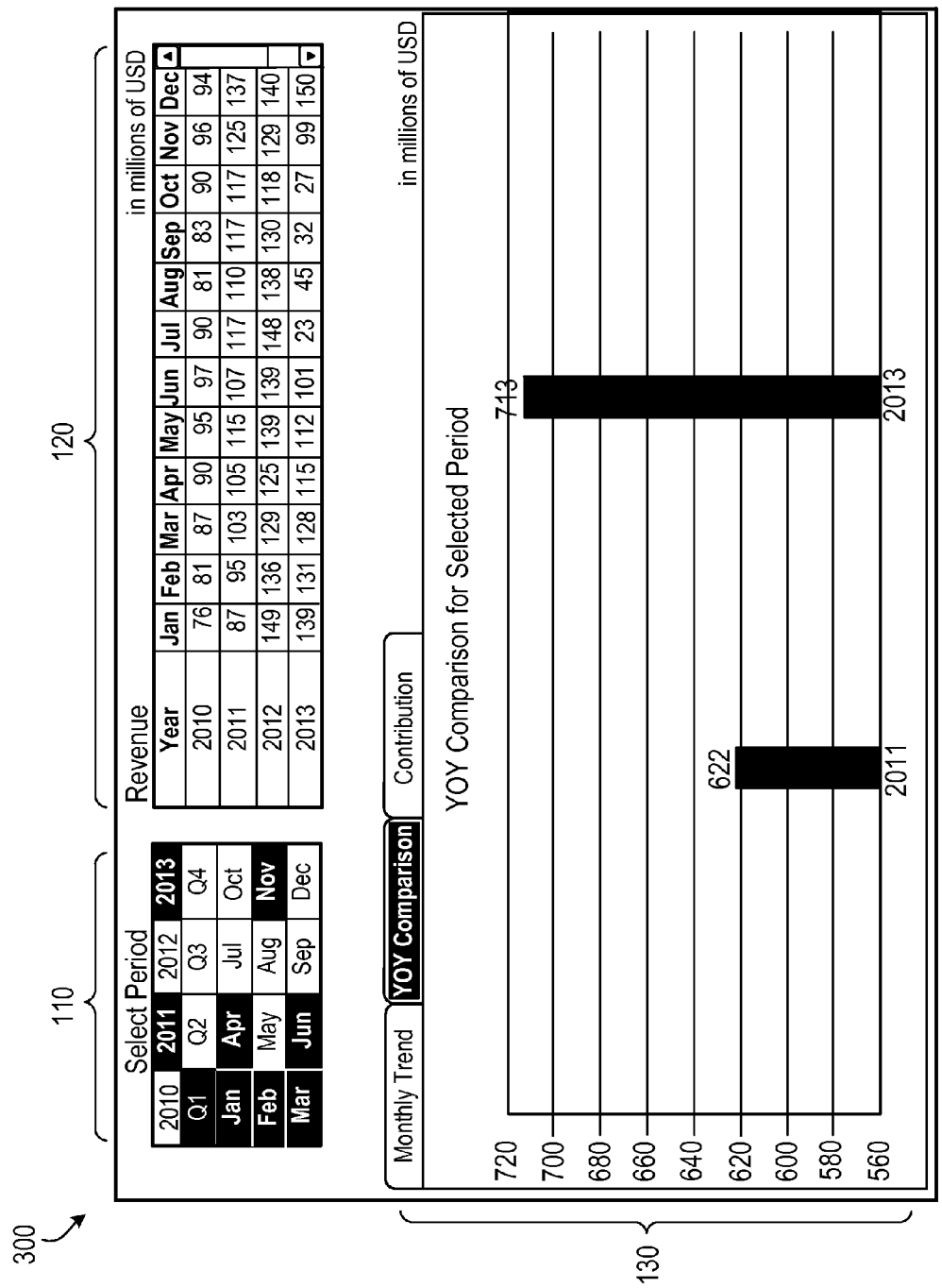
FIG. 3 is an example interface showing alternative analytical information.

FIG. 3 is an example interface 300 showing alternative information in the analytical information display 130. As shown by interface 300, the analytical information display 130 may include a year over year (YoY) bar graph. The bars in the year over year bar graph represent years, and the values of the bars represent the total of the revenues for the corresponding year during the selected months.

Figure 4:
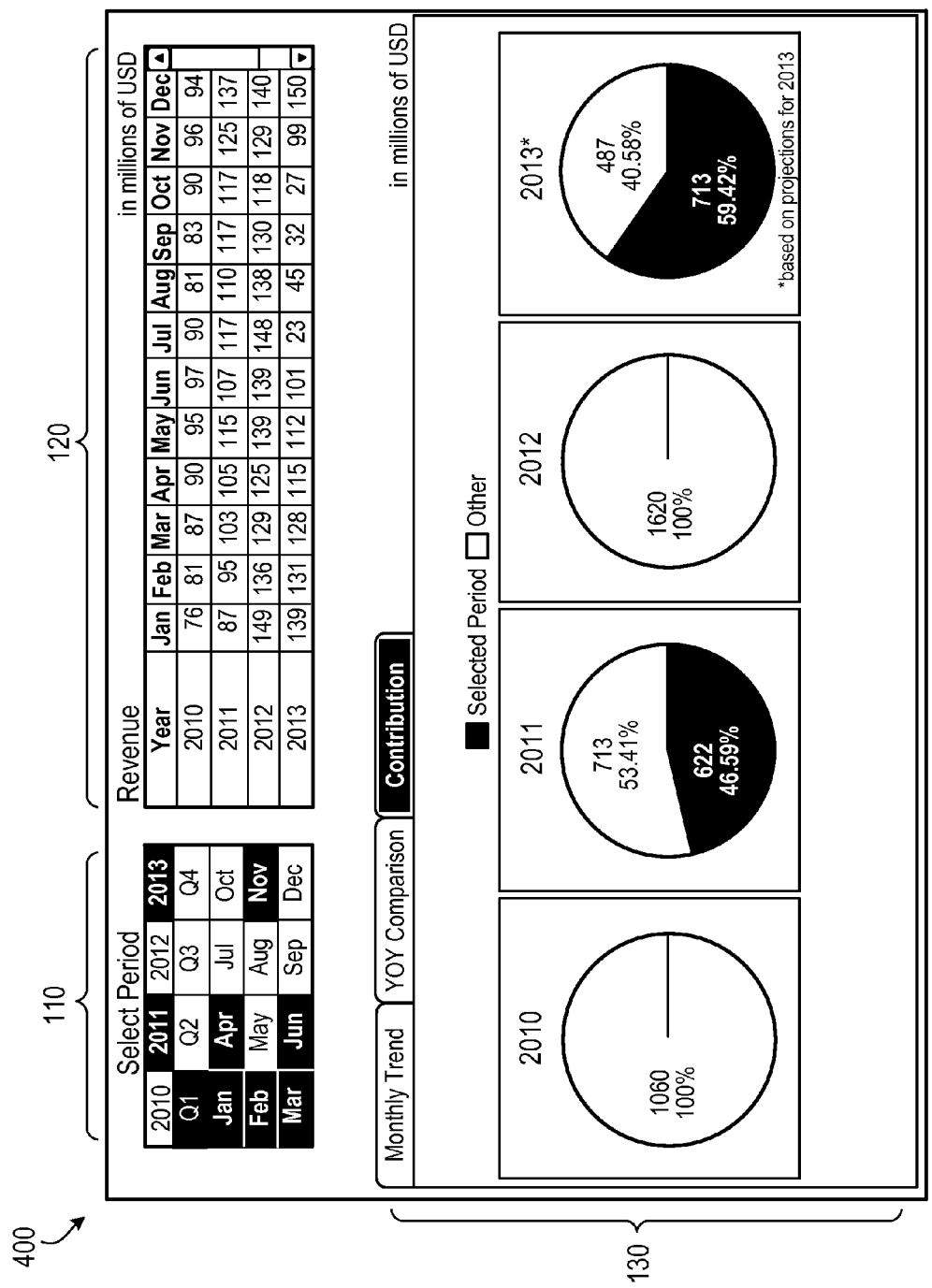
FIG. 4 is an example interface showing other analytical information.

FIG. 4 is an example interface 400 showing other analytical information in the analytical information display 130. As shown by interface 400, the analytical information display 130 may include pie charts. The pie charts may correspond to the years, where each pie chart for a year may show a slice for portions of the year corresponding to the selections and show another slice for portions of the year that do not correspond to the selections.

Analytical information may also be displayed in the analytical information display 130 using other forms of display, e.g., line graphs, area graphs, scatter plots, or radar graphs. The different types of displays may be dynamically switched based on the selection of tabs that correspond to the different types of displays.

In other interfaces, no analytical information may be shown. For example, the widget 110 may be used to capture input based on a user selection made using the widget 110. For example, the multi-selection widget may be used in a timesheet entry system where users may provide an input into the system by entering the total number of days worked against selected months and year.

FIG. 5 is an example widget 500 including controls for first, second, and third level reporting periods. The reporting periods may refer to periods of time that reports are generated for, e.g., years, quarters, months, and days. The level of a reporting period may refer to the duration of each of the instances of the reporting period. For example, years may be a first level, quarters may be a second level, months may be a third level, and days may be a fourth level. An instance of a level of a reporting period may refer to a specific year, quarter, month, or day. For example, the year 2011 is an instance of a level of reporting period corresponding to years and the month January is an instance of a level of reporting period corresponding to months.

The instances of a level reporting period may be longer or shorter than the instances of another level reporting period. For example, each instance of a first level reporting period corresponding to years is longer than each instance of a second level reporting period corresponding to quarters, and each instance of a third level reporting period corresponding to months is shorter than each instance of the second level reporting period corresponding to quarters.

The instances of the second level reporting period may be non-overlapping and collectively entirely cover an instance of the first level reporting period. For example, the instances for all the quarters may each cover a separate quarter and may collectively cover a single year.

In widget 500, the first level reporting period may refer to years, the second level reporting period may refer to quarters, and the third level reporting period may refer to months. The controls for the various level reporting periods are included in a single grid. Controls for the first level reporting period 512A-D are included in a first section 510 of the grid, controls for the second level reporting period 522A-D are included in a second section 520 of the grid, and controls for the third level reporting period 532A-L are included in a third section 530 of the grid.

The first section 510 is included at the top of the grid, the second section 520 is included in the middle of the grid, and the third section 530 is included at the bottom of the grid. However, the sections may be included in the grid in a different order. For example, the order of the sections may be reversed. The sections of the grid may also be arranged from left to right instead of top to bottom. For example, the grid may be transposed so that the top side of the grid becomes the left side of the grid or the right side of the grid.

Widget 500 includes four controls for the first level reporting period 512A-512D on a single row, four controls for the second level reporting period 522A-522D on a single row, and twelve controls for the third level reporting period 532A-532L distributed across three rows. The controls may be each associated with a different instance of a reporting period. Controls for the first level reporting period 512A-D may be associated with the instances representing years, e.g., Year 1, Year 2, Year 3, and Year 4. Controls for the second level reporting period 522A-D may be associated with the instances representing quarters, e.g., Quarter 1, Quarter 2, Quarter 3, and Quarter 4. Controls for the third level reporting period 532A-L may be associated with the instances representing months, e.g., January, February, . . . , and December.

The controls may be individually selectable by a user. For example, the widget 500 may permit users to click on individual controls to select the controls. Selecting a control for an instance of a reporting period may also be referred to as selecting the instance of the reporting period. For example, selecting a control for the year 2011 may also be referred to as selecting the year 2011.

Users may be able to use the widget 500 to select individual years, individual quarters, or individual months. Selection of any quarter in the widget 500 may result in the selection of months within the selected quarter. For example, selecting Quarter 1 may result in the selection of January, February, and March. A selected quarter or selected month may be considered to be selected in the selected years. For example, selecting controls for the months January and March, and the years 2010 and 2012 may result in a selection corresponding to the periods of January 2010, March 2010, January 2012, and March 2012.

The selected controls may be associated with instances of a reporting period where the instances are non-consecutive relative to each other. For example, January and March may be selected without selecting February, and the years 2010 and 2012 may be selected without selecting the year 2011.

Selected controls may also be de-selected by clicking on the selected control. When a quarter is selected, all months within the quarter may be selected. De-selecting a control for a month within a selected quarter may de-select the month and de-select the quarter. De-selecting a quarter may de-select the quarter and de-select all the months within the selected quarter.

Alternatively or additionally, controls may be selected and de-selected through other interactions. Selections may be made by control key based multiple selection, click-drag-and-release based selection, quarters with similar performance selected together, and months with similar performance selected together. A mouse, a keyboard, a touchscreen, a voice command, or a hand gesture may be used to select controls.

FIG. 6 is an example widget 600 including additional controls for a first level reporting period. As shown in widget 600, the first level reporting period may correspond to years. Widget 600 includes eight controls for the first level reporting period as opposed to the four controls for the first level reporting period shown in widget 500. The four additional controls may represent additional selectable years. The four additional controls in widget 600 may be included in the first section 510 of the grid as an additional row of controls below the row for the original four controls of the first level reporting period and above the row for the controls of the second level reporting period within the second section 520 of the grid.

The number of controls at each level may vary in number. For example, four, eight, or twelve controls may be included. The number of controls may also not be a multiple of four. For example, two controls may be included and the two controls may be sized to each have twice the width compared to when four controls are included. The controls for a level may also be distributed in multiple locations, e.g., at the top and the bottom of the grid.

FIG. 7 is an example widget 700 including controls for first and second level reporting periods. Widget 700 does not include a third level reporting period in the grid. The first level reporting period corresponds to years and the second level reporting period corresponds to months.

FIG. 8 is an example widget 800 including additional controls for a first level reporting period. Widget 800 also includes controls for a second level reporting period but does not include a third level reporting period in the grid. The first level reporting period corresponds to years and the additional controls for the first level reporting period correspond to additional years.

FIG. 9 is an example widget 900 including a single control 902 for a first level reporting period. The first level reporting period corresponds to years. The widget 900 shows the single control 902 corresponding to a single year, e.g., Year 1.

The single control 902 may only show a single year and may correspond to the year shown. The single control 902 may enable a user to change the selected year. For example, the single control 902 may include left and right arrows which a user may select to change the year shown in the single control 902, which may change the selected year to the year shown. As an example, the single control 902 may show the year 2010 and interacting with, e.g., clicking on, a left arrow may change the year shown in the single control 902 to 2009. Alternatively or additionally, interacting with the single control 902 may open a pop-up window in which the user may select another year. Similarly to some of the above widgets, widget 900 also includes controls for a second level reporting period and controls for a third level reporting period.

FIG. 10 is an example widget 1000 including a single control 902 for a first level reporting period and controls for a second level reporting period. Widget 1000 may differ from widget 900 in that widget 1000 does not include controls for a third level reporting period.

FIG. 11 is an example widget 1100 including alert indicators 1110A-D in controls for a second level reporting period. The widget 1100 may appear similar to widget 900 except for including the alert indicators 1110A-D. The alert indicators may visually indicate information regarding the instances corresponding to the alerts. Alert indicators may be shapes, icons, or text which may vary in color, size, shape, or content, e.g., up or down arrows.

The alerts may indicate a result of a comparison between a value of an instance associated with a second level reporting period, e.g., a quarter, and a corresponding value of the instance associated with the second level reporting period during a previous instance of a first level reporting period, e.g., the same quarter the year before. The alerts may also indicate a result of a comparison between two varying types of values associated with the same second level reporting period, e.g., actual sales and budgeted sales for the same quarter. The result may be an increase or decrease in the value.

For example, the alerts may indicate that the revenues during a given quarter have increased or decreased compared to the same quarter the previous year. Alternatively or additionally, the alerts may indicate an increase or decrease for the same quarter the following year. In some examples, the alerts may indicate the level of increase or decrease.

FIG. 12 is an example widget 1200 including alert indicators in controls for a third level reporting period. The controls for the third level reporting period may correspond to months and the alert indicators may indicate increases or decreases in the months compared to the months in the previous year.

FIG. 13 is an example widget 1300 including alert indicators in controls for second and third level reporting periods. The controls for the second level reporting period may correspond to quarters and the controls for the third level reporting period may correspond to months.

FIG. 14 is another example widget 1400 including alert indicators in controls for a second level reporting period. The widget 1400 may appear similar to widget 1300, except widget 1400 may not include controls for the third reporting period and may not include the corresponding alert indicators in the controls for the third reporting period.

Figure 15:
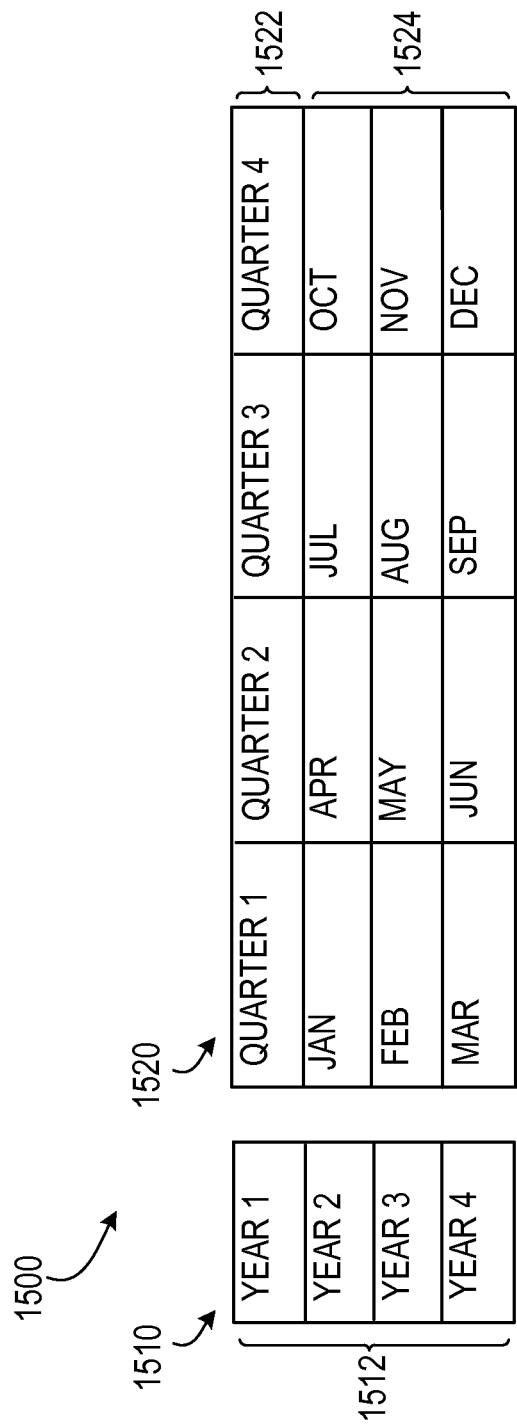
FIG. 15 is an example widget including controls in two grids.

FIG. 15 is an example widget 1500 including controls in a first grid 1510 and a second grid 1520. The first grid 1510 includes a section 1512 for controls for a first level reporting period, e.g., years. The second grid 1520 includes a first section 1522 for controls for a second level reporting period, e.g., quarters, and a second section 1524 for controls for a third level reporting period, e.g., months. The first grid 1510 and second grid 1520 are horizontally aligned with a small space between the grids 1510 and 1520 and the first grid 1510 is to the left of the second grid 1520. However, the grids 1510 and 1520 may have different relative positions. For example, grids 1510 and 1520 may be positioned right to left or may be vertically aligned.

Figure 16:
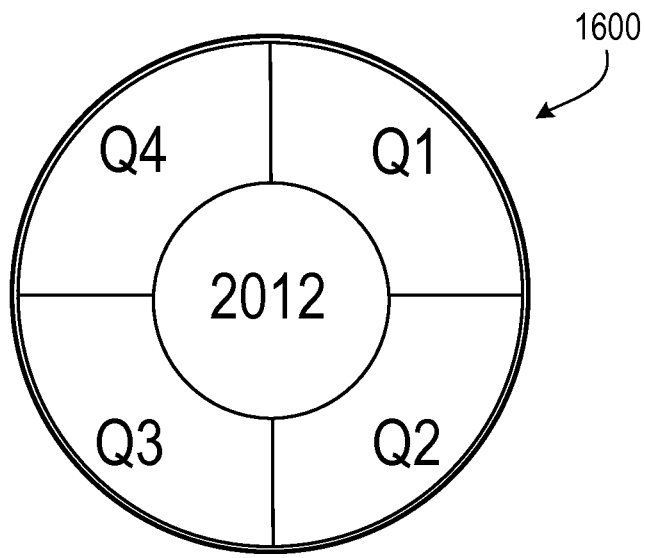
FIG. 16 is an example circular widget including controls for first and second level reporting period.

FIG. 16 is an example circular widget 1600 including controls for a second level reporting period. The widget 1600 includes a control for a first level reporting period, e.g., year, in the center of the widget 1600. The instance corresponding to the control may be changed, for example, as described above in regards to control 902 in FIG. 9.

The control for the first level reporting period is surrounded by four controls for a second level reporting period, e.g., quarters, forming a ring around the control for the first level reporting period. The four controls are each a quarter ring corresponding to a particular quarter. For example, quarter rings may be ordered clockwise starting from the top so that the top right quarter ring may correspond to Quarter 1, the bottom right quarter ring may correspond to Quarter 2, the bottom left quarter ring may correspond to Quarter 3, and the top left quarter ring may correspond to Quarter 4.

Figure 17:
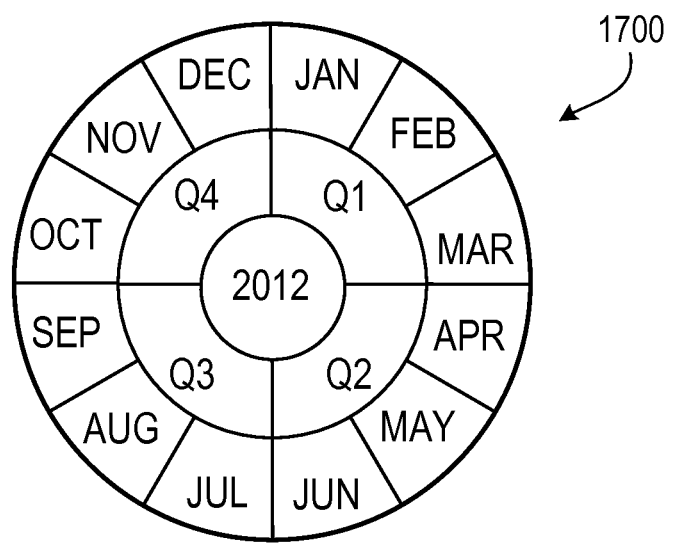
FIG. 17 is an example circular widget including controls for first, second, and third level reporting periods.

FIG. 17 is an example circular widget 1700 including controls for second and third level reporting periods. The widget 1700 may include similar controls to widget 1600 with additional controls for a third level reporting period, e.g., months, forming a ring surrounding the controls for the first level reporting period and the second level reporting period. The additional controls for the third level reporting period may each correspond to a month, and the controls may be ordered and sized so that the controls are twelve controls that represent January through December, starting from the top of the widget 1700 and proceeding in clockwise order.

While not shown, other shapes for the widget may be used with various orders for instances. For example, the widget may have three, four, five, six or more sides. The widget may, additionally or alternatively, include various level reporting periods, e.g., decades, years, half-years, quarters, months, bi-weeks, weeks, days, hours, minutes, or seconds.

Figure 18:
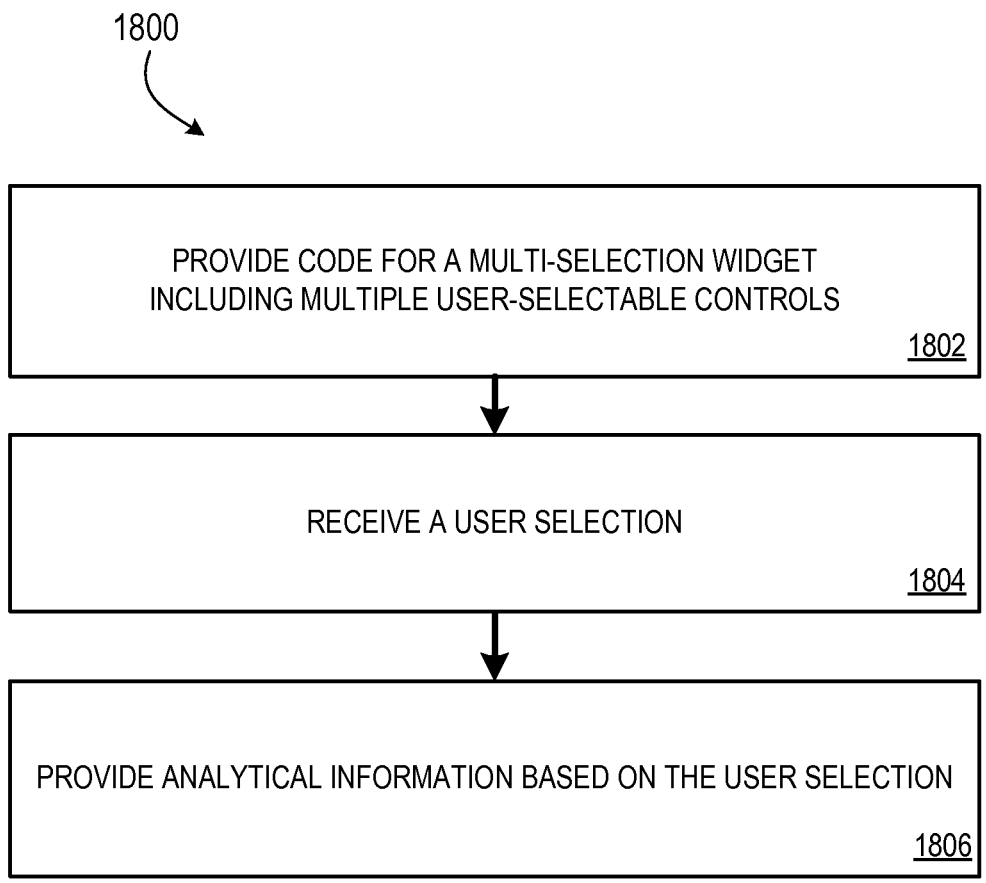
FIG. 18 is a flowchart of an example process for providing analytical information using a multi-selection widget.

FIG. 18 is a flowchart of an example process 1800 for providing analytical information using a multi-selection widget. The following describes process 1800 referring to portions of interface 100 described with reference to FIG. 1. However, the process 1800 may be performed using other interfaces. Process 1800 may be performed on a system. The system may be a client computing device, a server computing device, or a combination of a client computing device and a server computing device.

The system may provide code for a multi-selection widget including multiple user-selectable controls (1802). The multi-selection widget may be, for example, one of the previously described widgets in FIGS. 1-17. The system may use the provided code to output interface 100 including the multi-selection widget to the user.

The system may receive a user selection (1804). The user selection may include one or more selected controls from a single level of reporting period. For example, the user selection may include a selection of the years 2010 and 2012 for the level of reporting period corresponding to years, or a selection of March and June from the level of reporting period corresponding to months. When the single level of the reporting period includes only one control, the one control may be considered as selected.

The system may receive the user selection dynamically. Each time the user selects or de-selects a control, the system may consider the currently selected controls as a user selection. Accordingly, the system may receive in real-time a user selection each time a control is selected or de-selected. Alternatively or additionally, a control may be included to manually provide a user selection to the system after the user has finalized a selection of controls. For example, manually providing a selection may be used when the selections are not dynamic or when the underlying data has changed since the last selection was received by the system.

The system may provide analytical information based on the user selection (1806). The system may provide analytical information based on the selected controls in the user selection. For example, if the user selection includes January and the years 2010 and 2012, the system may provide analytical information for January 2010 and January 2012 in the analytical information display 130.

The system may obtain the analytical information the system provides to the user. For example, the system may provide a structured query language (SQL) query based on the user selection to a SQL-based database and display results of the query received from the database. For example, if the user selection includes the month January and the years 2010 and 2012, the SQL query the system provides to a SQL-based database may be a request for the month, year, and value for all cells that correspond to the month January and the years 2010 or 2012. In some implementations, instead of providing analytical information or in additional to providing analytical information, the system may use the user selection for capturing inputs.

Figure 19:
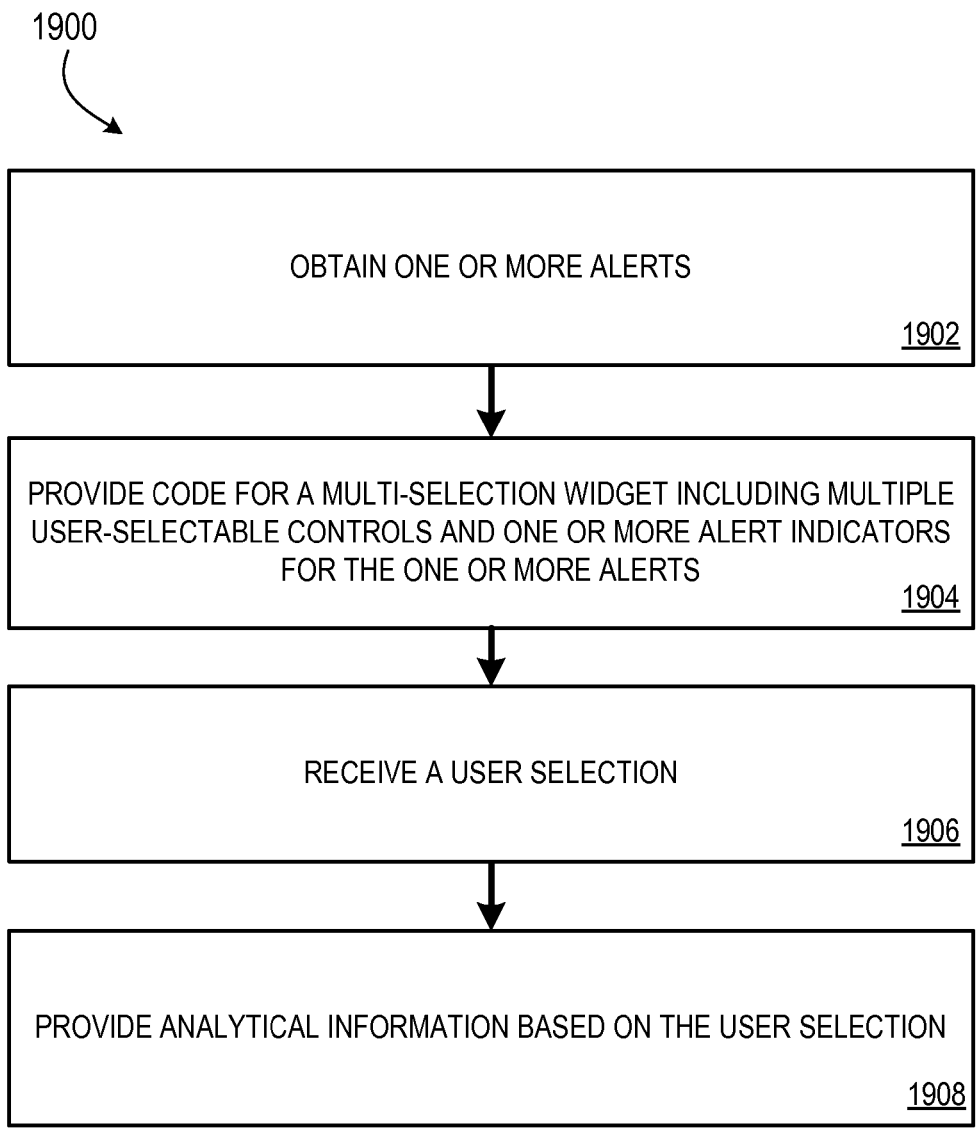
FIG. 19 is a flowchart of an example process for providing alert indicators using a multi-selection widget.

FIG. 19 is a flowchart of an example process 1900 for providing analytical information using a multi-selection widget. The following describes process 1900 referring to portions of interface 100 described with reference to FIG. 1. However, the process 1900 may be performed using other interfaces. Process 1900 may be performed on a system. The system may be a client computing device, a server computing device, or a combination of a client computing device and a server computing device.

The process 1900 may begin with the system obtaining one or more alerts (1902). As described above, alerts may indicate a result of a comparison between a month or quarter for one year compared to the month or quarter in a previous year, or between two types of values for the same month or quarter. The system may obtain the one or more alerts by receiving the alerts from an external source or generating the alerts by comparing the months or quarters using the system.

The system may provide code for a multi-selection widget including multiple user-selectable controls and one or more alert indicators for the one or more alerts (1904). For example, the system may provide the code for the widgets 1100, 1200, 1300, or 1400 shown in FIGS. 11-14.

The system may receive a user selection (1906). For example, the system may receive a user selection as described above in (1804) of FIG. 18.

The system may provide analytical information based on the user selection (1908). For example, the system may provide analytical information based on the user selection as described above in (1806) of FIG. 18. In some implementations, instead of providing analytical information or in addition to providing analytical information, the user selection may be used for capturing an input into the system.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
providing code for a multi-selection widget, wherein the widget includes:
  multiple user-selectable controls aligned on a grid,
    wherein the multiple user-selectable controls include a first set of three or more controls that are each associated with a different instance of a first level reporting period, the first set of three or more controls included in a first section of the grid, and
    wherein the multiple user-selectable controls further include a second set of three or more controls that are each associated with a different instance of a second level reporting period that is shorter than the instances of the first level reporting period, the second set of three or more controls included in a second section of the grid;
determining that a user selection includes (i) two or more controls of the first set that are associated with instances of the first level reporting period that are non-consecutive relative to one another, and (ii) two or more controls of the second set that are associated with instances of the second level reporting period that are non-consecutive with one another;
generating analytical information including information on:
  a first instance of the second level reporting period in a first instance of the first level reporting period,
  a second instance of the second level reporting period in the first instance of the first level reporting period,
  the first instance of the second level reporting period in a second instance of the first level reporting period, and
  the second instance of the second level reporting period in the first instance of the first level reporting period,
  wherein the analytical information does not include information on any instances of the second level reporting period occurring between the first instance of the second level reporting period and the second instance of the second level reporting period; and
providing, based on the user selection, the analytical information for output on a chart, one axis of which is labeled to identify the reporting periods associated with the user-selected controls, and is not labeled to identify any other reporting periods.

2. The method of claim 1, wherein the multiple user-selectable controls further include:
a third set of two or more controls that are each associated with a different instance of a third level reporting period that are shorter than the instances of the second level reporting period, the third set of two or more controls included in a third section of the grid,
wherein receiving the user selection includes receiving at least one control of the third set.

3. The method of claim 2, wherein the first level reporting period corresponds to years, the second level reporting period corresponds to quarters, and the third level reporting period corresponds to months.

4. The method of claim 1, wherein the first level reporting period corresponds to years and the second reporting period corresponds to months.

5. The method of claim 1, wherein the first level reporting period corresponds to quarters and the second level reporting period corresponds to months.

6. The method of claim 1, wherein the first set of one or more controls comprises of two or more controls, wherein the user selection comprises of at least one control of the first set and at least three controls of the second set.

7. The method of claim 1, comprising:
obtaining one or more alerts that are each associated with an instance of the different instances of the first level reporting period,
wherein the widget further includes one or more alert indicators in controls of the two or more controls that correspond to the different instances associated with the one or more alerts.

8. The method of claim 7, wherein the one or more alerts indicate a result of a comparison between a value of the associated instance of the first level reporting period and either a corresponding value of an associated instance of the first level reporting period during a previous instance of the first level reporting period, or a different value associated with the same instance of the first level reporting period.

9. The method of claim 8, wherein the result comprises at least one of an increase or a decrease in the value.

10. The method of claim 8, wherein the first level reporting period corresponds to months and the previous instance of the first level reporting period corresponds to the same month in the previous year.

11. A system comprising:
one or more computers and one or more storage devices storing instructions that are operable, when executed by the one or more computers, to cause the one or more computers to perform operations comprising:
providing code for a multi-selection widget, wherein the widget includes:
multiple user-selectable controls aligned on a grid,
wherein the multiple user-selectable controls include a first set of three or more controls that are each associated with a different instance of a first level reporting period, the first set of three or more controls included in a first section of the grid, and
wherein the multiple user-selectable controls further include a second set of three or more controls that are each associated with a different instance of a second level reporting period that is shorter than the instances of the first level reporting period, the second set of three or more controls included in a second section of the grid;
determining that a user selection includes (i) two or more controls of the first set that are associated with instances of the first level reporting period that are non-consecutive relative to one another, and (ii) two or more controls of the second set that are associated with instances of the second level reporting period that are non-consecutive with one another;
generating analytical information including information on:
a first instance of the second level reporting period in a first instance of the first level reporting period,
a second instance of the second level reporting period in the first instance of the first level reporting period,
the first instance of the second level reporting period in a second instance of the first level reporting period, and
the second instance of the second level reporting period in the first instance of the first level reporting period,
wherein the analytical information does not include information on any instances of the second level reporting period occurring between the first instance of the second level reporting period and the second instance of the second level reporting period; and
providing, based on the user selection, the analytical information for output on a chart, one axis of which is labeled to identify the reporting periods associated with the user-selected controls, and is not labeled to identify any other reporting periods.

12. A non-transitory computer-readable medium storing software comprising instructions executable by one or more computers which, upon such execution, cause the one or more computers to perform operations comprising:
providing code for a multi-selection widget, wherein the widget includes:
multiple user-selectable controls aligned on a grid,
wherein the multiple user-selectable controls include a first set of three or more controls that are each associated with a different instance of a first level reporting period, the first set of three or more controls included in a first section of the grid, and
wherein the multiple user-selectable controls further include a second set of three or more controls that are each associated with a different instance of a second level reporting period that is shorter than the instances of the first level reporting period, the second set of three or more controls included in a second section of the grid;
determining that a user selection includes (i) two or more controls of the first set that are associated with instances of the first level reporting period that are non-consecutive relative to one another, and (ii) two or more controls of the second set that are associated with instances of the second level reporting period that are non-consecutive with one another;
generating analytical information including information on:
a first instance of the second level reporting period in a first instance of the first level reporting period,
a second instance of the second level reporting period in the first instance of the first level reporting period,
the first instance of the second level reporting period in a second instance of the first level reporting period, and
the second instance of the second level reporting period in the first instance of the first level reporting period,
wherein the analytical information does not include information on any instances of the second level reporting period occurring between the first instance of the second level reporting period and the second instance of the second level reporting period; and providing, based on the user selection, the analytical information for output on a chart, one axis of which is labeled to identify the reporting periods associated with the user-selected controls, and is not labeled to identify any other reporting periods.

13. The medium of claim 12, wherein the multiple user-selectable controls further include:

a third set of two or more controls that are each associated with a different instance of a third level reporting period that are shorter than the instances of the second level reporting period, the third set of two or more controls included in a third section of the grid, wherein receiving the user selection includes receiving at least one control of the third set.

14. The medium of claim 13, wherein the first level reporting period corresponds to years, the second level reporting period corresponds to quarters, and the third level reporting period corresponds to months.

15. The medium of claim 12, wherein the first level reporting period corresponds to years and the second reporting period corresponds to months.

16. The medium of claim 12, wherein the first level reporting period corresponds to quarters and the second level reporting period corresponds to months.

17. The medium of claim 12, wherein the first set of one or more controls comprises of two or more controls, wherein the user selection comprises of at least one control of the first set and at least two controls of the second set.

18. The medium of claim 12, comprising:

obtaining one or more alerts that are each associated with an instance of the different instances of the first level reporting period, wherein the widget further includes one or more alert indicators in controls of the two or more controls that correspond to the different instances associated with the one or more alerts.

19. The medium of claim 18, wherein the one or more alerts indicate a result of a comparison between a value of the associated instance of the first level reporting period and either a corresponding value of an associated instance of the first level reporting period during a previous instance of the first level reporting period, or a different value associated with the same instance of the first level reporting period.

20. The medium of claim 19, wherein the result comprises at least one of an increase or a decrease in the value.

* * * * *